United States Patent
Knöpfle

(10) Patent No.: US 12,351,246 B2
(45) Date of Patent: Jul. 8, 2025

(54) VEHICLE ROOF COMPRISING A ROOF OPENING SYSTEM HAVING TWO KINEMATIC UNITS

(71) Applicant: Webasto SE, Stockdorf (DE)

(72) Inventor: Julian Knöpfle, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 372 days.

(21) Appl. No.: 17/802,660

(22) PCT Filed: Mar. 9, 2021

(86) PCT No.: PCT/EP2021/055911
§ 371 (c)(1),
(2) Date: Aug. 26, 2022

(87) PCT Pub. No.: WO2021/180718
PCT Pub. Date: Sep. 16, 2021

(65) Prior Publication Data
US 2023/0008758 A1    Jan. 12, 2023

(30) Foreign Application Priority Data
Mar. 11, 2020 (DE) .......... 10 2020 106 644

(51) Int. Cl.
*B62D 35/00* (2006.01)
*B60J 7/16* (2006.01)

(52) U.S. Cl.
CPC ............ *B62D 35/00* (2013.01); *B60J 7/1642* (2013.01)

(58) Field of Classification Search
CPC ......... B62D 35/00; B60J 7/1642; B60J 7/192; B60J 7/0435
See application file for complete search history.

(56) References Cited

U.S. PATENT DOCUMENTS

| | | | |
|---|---|---|---|
| 2012/0193945 A1* | 8/2012 | Sawada | B60J 7/024 296/223 |
| 2013/0020837 A1* | 1/2013 | Hirata | B60J 7/024 296/216.04 |

(Continued)

FOREIGN PATENT DOCUMENTS

| | | |
|---|---|---|
| CN | 106457985 A | 2/2017 |
| CN | 108367658 A | 8/2018 |

(Continued)

OTHER PUBLICATIONS

International Search Report for PCT/EP2021/055911 mailed Jun. 4, 2021, in English and German (7 pages).

(Continued)

*Primary Examiner* — Paul N Dickson
*Assistant Examiner* — Sara Laghlam
(74) *Attorney, Agent, or Firm* — Fitch, Even, Tabin & Flannery, LLP

(57) ABSTRACT

A vehicle roof having a roof opening system having a cover element which is displaceable between a closed position, in which a roof opening is closed, and an open position, in which the roof opening is open; displacement kinematics for displacing the cover element on either side of a vertical longitudinal center roof plane, each displacement kinematics may have a guide rail, a first kinematic unit guided in the guide rail, and a second kinematic unit guided in the guide rail; and a set of drive cables for the two kinematic units, the first kinematic unit may have a first deploying lever which is adjustable between a raised position and a lowered position, and the second kinematic unit may have a second deploying lever. The first kinematic unit has a securing slide which is guided in the guide rail and secures the first deploying lever in its lowered position.

5 Claims, 13 Drawing Sheets

(56) References Cited

U.S. PATENT DOCUMENTS

| | | |
|---|---|---|
| 2017/0197496 A1 | 7/2017 | Wingen |
| 2018/0264920 A1 | 9/2018 | Stenvers |
| 2018/0326821 A1* | 11/2018 | Heidan .................. B60J 7/057 |
| 2018/0326823 A1 | 11/2018 | Heidan |
| 2021/0245589 A1* | 8/2021 | Teufel .................. B60J 7/0435 |
| 2021/0370749 A1 | 12/2021 | Knoepfle et al. |

FOREIGN PATENT DOCUMENTS

| | | |
|---|---|---|
| DE | 3532111 A1 * | 3/1987 |
| DE | 102010041825 A1 | 4/2012 |
| DE | 102017207890 A1 | 11/2018 |
| DE | 102018113991 A1 | 12/2019 |
| DE | 102018124382 A1 | 4/2020 |
| EP | 2481619 A2 | 8/2012 |
| EP | 3138711 A2 | 3/2017 |

OTHER PUBLICATIONS

Written Opinion of the International Searching Authority for PCT/EP2021/055911 mailed Sep. 6, 2022, in English (6 pages).
Office Action issued in corresponding Chinese Application No. 202180020483X; mailed Dec. 21, 2024; In Chinese with English machine translation (16 pages).

* cited by examiner

VEHICLE ROOF COMPRISING A ROOF OPENING SYSTEM HAVING TWO KINEMATIC UNITS

CROSS-REFERENCE TO RELATED APPLICATION

This application is a U.S. national phase application filed under 35 U.S.C. § 371 of International Application No. PCT/EP2021/055911, filed Mar. 9, 2021, designating the United States, which claims priority from German Patent Application Number 10 2020 106 644.9 filed on Mar. 11, 2020, which are hereby incorporated herein by reference in its entirety for all purposes.

FIELD

The invention relates to a vehicle roof having the features of the preamble of claim 1.

BACKGROUND

A vehicle roof of this kind is known from practice and can in particular be what is referred to as a spoiler roof which comprises a roof opening system, a cover element of which can be raised upward by its rear edge relative to a fixed roof portion starting from a closed position, in which the roof opening is closed, and be moved toward the rear, i.e., in the longitudinal roof direction, over the fixed roof portion to open the roof opening. The cover element is coupled to displacement kinematics on either side of a vertical longitudinal center roof plane, allowing it to be displaced between the closed position and the open position. The displacement kinematics each comprise a front kinematic unit guided in a guide rail and a rear kinematic unit also guided in the guide rail. When the cover element is being displaced into the open position, a deploying lever of the rear kinematic unit is pivoted, causing the rear edge of the cover element to be raised. Then, the front kinematic unit is decoupled from the rear kinematic unit and is guided backward in the guide rail, a slotted track or a control track formed on the cover element being moved on the deploying lever of the now fixed rear kinematic unit, the deploying lever being provided with a sliding element. When the deploying lever is being deployed, the front kinematic unit and the rear kinematic unit are connected to each other via a coupling rod. Once the deploying lever has been deployed, the coupling rod is detached from the front kinematic unit, whereby the rear kinematic unit stays in position, whereas the front kinematic unit can be moved toward the fixed rear kinematic unit. The front kinematic unit can also comprise a deploying lever which can be pivoted between a lowered position and a raised position and by whose actuation the front edge of the cover element can be raised. A reliable and gentle securing of the deploying lever of the front kinematic unit in the lowered position, which is associated with the closed position of the cover element, is not implemented in the known vehicle roof.

SUMMARY

The object of the invention is to provide a vehicle roof of the kind mentioned above where the deploying lever of the front kinematic unit can be secured in its lowered position in a manner gentle on the components.

According to the invention, this objet is attained by the vehicle roof having the features of claim 1.

So the vehicle roof according to the invention comprises a roof opening system having a cover element which can be displaced between a closed position, in which a roof opening is closed, and an open position, in which the roof opening is open. Displacement kinematics for displacing the cover element are disposed on either side of a vertical longitudinal center roof plane, each displacement kinematics comprising a first kinematic unit guided in the guide rail and a second kinematic unit guided in the guide rail. A set of drive cables is provided for driving the two respective kinematic units. The first kinematic unit comprises a first deploying lever, which can be adjusted between a raised position and a lowered position. The second kinematic unit comprises a second deploying lever. To be able to sufficiently secure the lowered position of the first deploying lever and thus the closed position of the cover element, the first kinematic unit comprises a securing slide, which is guided in the guide rail and holds the deploying lever in its lowered position. So the securing slide can be moved between a locking position and a release position. In the release position, the first deploying lever can be pivoted. In the locking position, in which the securing slide is situated in particular when the cover element is in the closed position, the securing slide directly or indirectly holds the first deploying lever in its lowered position, which is associated with the closed position of the cover element, i.e., the lowered position of the front edge of the cover element. With the securing slide, a large contact surface to a mating element can be realized, allowing the overall system to withstand potential pulling forces exerted on the cover element in the vertical direction without being destroyed.

In a preferred embodiment of the vehicle roof according to the invention, the securing slide is a drive slide of the first kinematic unit, the drive slide actuating the first deploying lever. For example, this drive slide comprises a journal which engages a slotted piece formed on the first deploying lever. Upon actuation, the drive slide is first moved relative to the deploying lever, causing the latter to be pivoted by the interaction between the slotted piece and the journal. In the deployed state of the deploying lever, i.e., in its raised position, the drive slide and the deploying lever are secured to each other. Thus, moving the drive slide causes the cover element to shift in the longitudinal roof direction. Alternatively, the drive slide actuating the first deploying lever is a second slide in addition to the securing slide. In both cases, the securing slide, because of the large contact surface provided by it, prevents the journal from exerting holding forces acting linearly on the slotted piece, which is in particular injection-molded, and potentially damaging it, which could cause the cover element to rattle in its closed position, when the cover element is in the closed position.

In a specific embodiment of the vehicle roof according to the invention, the securing slide has a securing protrusion at the front, which is thus disposed on the front end face of the securing slide and can basically be a tab, a finger or a journal and interacts with a mating securing element to secure the first deploying lever in its lowered position, the mating securing element being disposed on the first deploying lever or on a component fixed to the cover element. In particular, the securing protrusion covers the mating securing element, preventing the cover element from being lifted at its front edge.

In an advantageous embodiment of the vehicle roof according to the invention which is optimized for installation space, the mating securing element is a securing cam or journal which is disposed on the deploying lever and which extends perpendicular to the guide rail. So the securing cam or the securing journal forms a protrusion of the first deploying lever which protrudes in the transverse direction and which is covered by the securing protrusion of the securing slide when the first deploying lever is in the lowered position.

In another specific embodiment of the vehicle roof according to the invention, the displacement kinematics disposed on either side of a vertical longitudinal center roof plane each comprise two separate drive assemblies composed of a drive motor and a drive cable for the two kinematic units. The two drive cables are guided in two cable duct sections of the guide rail in question. The first drive cable serves to actuate, i.e., move, the first, in particular front, kinematic unit. The second drive cable, which is driven by the second drive motor, serves to actuate the second, in particular rear, kinematic unit. The two drive cables make a coupling rod or the like for coupling the two kinematic units unnecessary. All that is required is for the two drive motors to be actuated in a synchronized manner, which takes place by means of a suitable control unit. Thus, high operational reliability is ensured. Potential disturbing noise resulting from the coupling and decoupling of a coupling rod cannot occur. The two cable duct sections for the two drive cables can be formed in the guide rail without taking up much installation space.

The vehicle roof according to the invention is in particular what is referred to as a spoiler roof. During the displacement into the open position, the cover element of a spoiler roof is typically moved over a rear fixed roof portion. To realize this, a sliding element on which a guide track of a cover support of the cover element is guided when the cover element is being displaced in the longitudinal roof direction can be disposed on each of the bilaterally disposed second deploying levers.

Other advantages and advantageous configurations of the subject matter of the invention are apparent from the description, the drawing, and the claims.

BRIEF DESCRIPTIONS OF THE DRAWINGS

An illustrative example of a vehicle roof according to the invention is schematically illustrated in the drawing and will be discussed in more detail in the following description.

DETAILED DESCRIPTION

Figure 1:
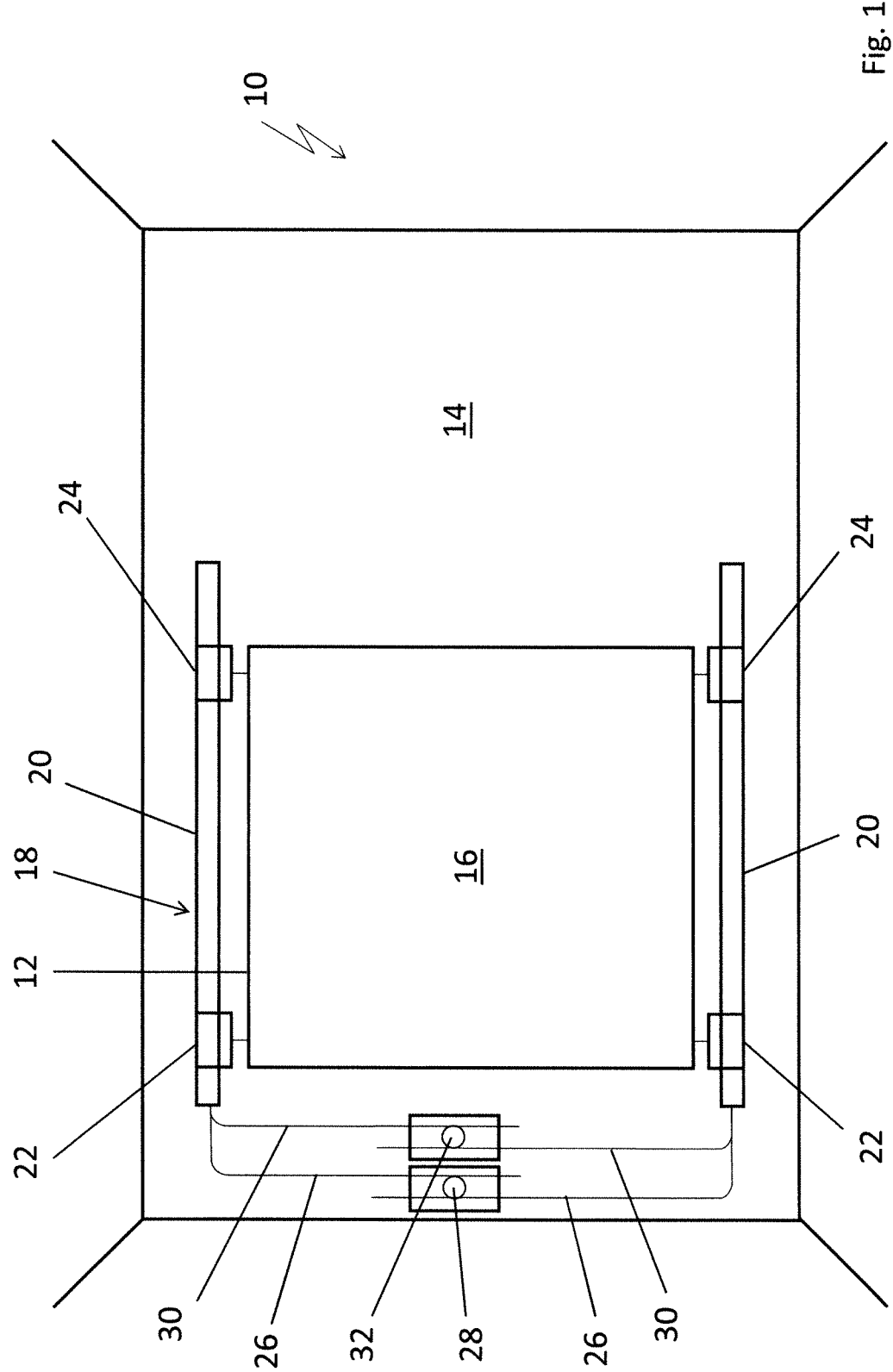
FIG. 1 is a schematic top view of a vehicle roof according to the invention.

In a highly schematized manner, FIG. 1 shows a vehicle roof 10, which is an openable vehicle roof of a passenger car and has a roof opening 12, which is limited by a fixed roof portion 14 and can be closed or at least partially opened at will by means of a cover element 16. Cover element 16 is part of a roof opening system 18, which forms a spoiler roof.

Roof opening system 18 of vehicle roof 10 comprises a guide rail 20 on either side of a vertical longitudinal center roof plane. A first front kinematic unit 22 and a second rear kinematic unit 24 are disposed in each guide rail 20. Front kinematic units 22 are driven by means of a first drive motor 28 via first drive cables 26. Rear kinematic units 24 are driven by means of a second drive motor 32 via second drive cables 30. In the embodiment at hand, the two drive motors 28 and 32 are each disposed centrally forward of roof opening 12 on a front frame part of a roof frame (not shown).

Roof opening system 18, which is illustrated in detail in FIGS. 2 to 13, is essentially mirror-symmetric with respect to a vertical longitudinal center roof plane. Hence, the following description largely relates to the displacement kinematics disposed on the left with respect to the forward direction of travel of the vehicle in question. The displacement kinematics disposed on the right with respect to the forward direction of travel is essentially mirror-symmetric thereto and equivalently apparent. Moreover, structural components of the roof opening system which are located in different planes in the transverse roof direction are projected into the drawing plane in FIGS. 2 to 12.

As explained above, the displacement kinematics each comprise a front kinematic unit 22 and a rear kinematic unit 24, which are disposed in a common guide rail 20 and are each connected to a separate drive cable 26 or 30. The two drive cables 26 and 30 are guided one above the other in guide channels 34 and 36 in respective guide rails 20, guide channels 34 and 36 being formed on one side of a guide track 38 in guide rail 20. The two kinematic units 22 and 24 are disposed and guided in guide track 38.

As can be seen in FIGS. 6 to 10 in particular, front kinematic unit 22 comprises a drive slide 40, which is connected to drive cable 26, which is guided in guide channel 34, and on which a journal 42 is disposed, which is guided in a deploying slotted piece 44. Deploying slotted piece 44 is formed on a deploying lever 46, which can be pivoted between a lowered position (FIG. 8) and a raised position (FIG. 10) and is hinged to a slide 45 via a hinge point 48 on one side and to a cover support 52 via a hinge point 50 on the other side, cover support 52 being fixed to the underside of cover element 16. Furthermore, front kinematic unit 22 has a slotted piece 54, which is formed at the front end of guide rail 20 and fixed to the roof and interacts with a guide journal 56, which is disposed on one side of deploying lever 46.

Deploying lever 46 of front kinematic unit 22 has a securing cam 90 on its side facing away from guide journal 56, securing cam 90 interacting with a front securing protrusion 92 of drive slide 40 of first kinematic unit 22 in such a manner when the cover element is in the closed position that securing protrusion 92, which protrudes forward at the front in the manner of a tab, covers securing cam 90, thus holding deploying lever 46 in its lowered position. For this purpose, securing protrusion 92, which points in the direction of the front roof edge from sliders of drive slide 40, has an even contact surface at its underside, the contact surface being in contact with the even upper side of securing cam 90. At its underside, securing cam 90 has a groove 94, which is engaged by a stop element 96, which is formed on guide rail 20 and holds cover element 16 in position in the longitudinal roof direction, when the cover element is in the closed position.

Figure 11:
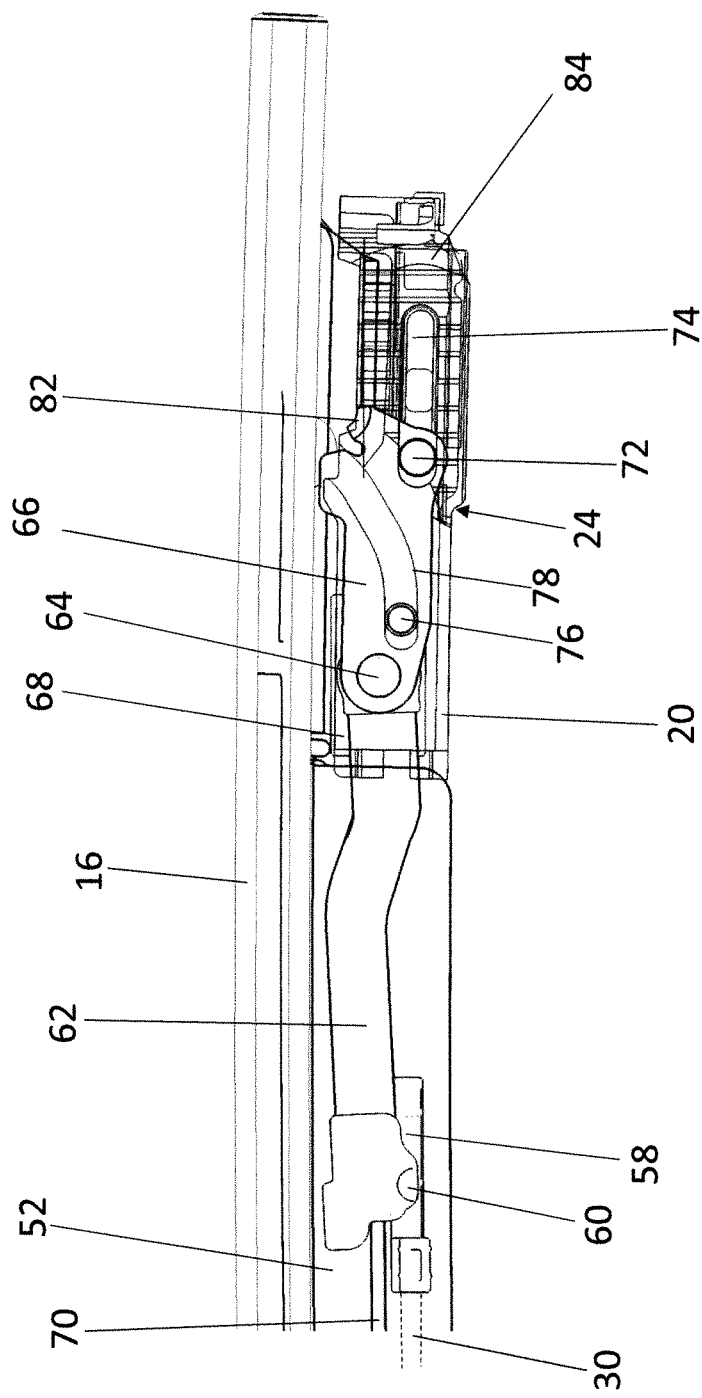
FIG. 11 shows a rear kinematic unit of the roof opening system for the closed position of the cover element.
Figure 12:
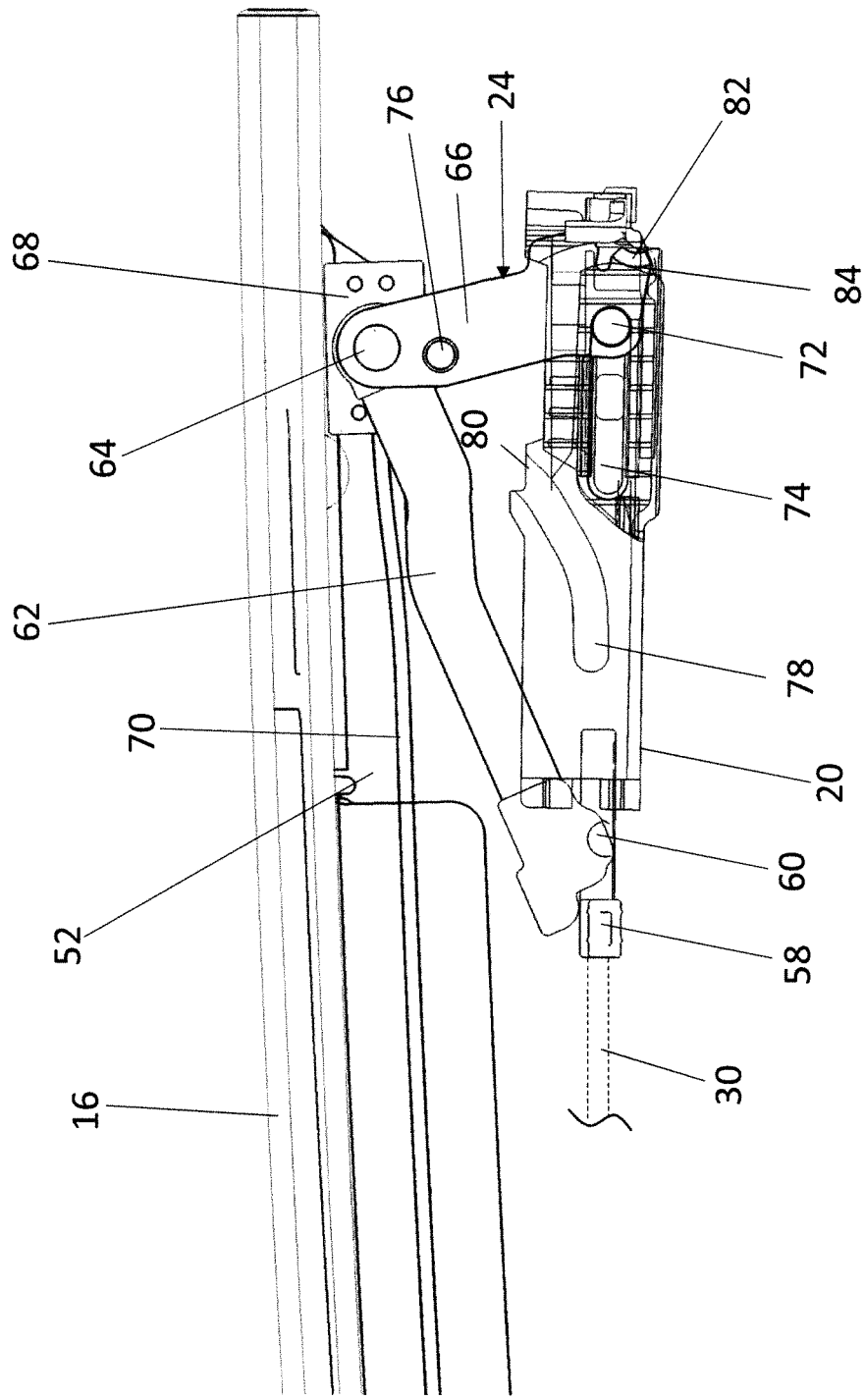
FIG. 12 is a view of the rear kinematic unit of the roof opening system corresponding to FIG. 11, but with the cover element in the raised state.
Figure 13:
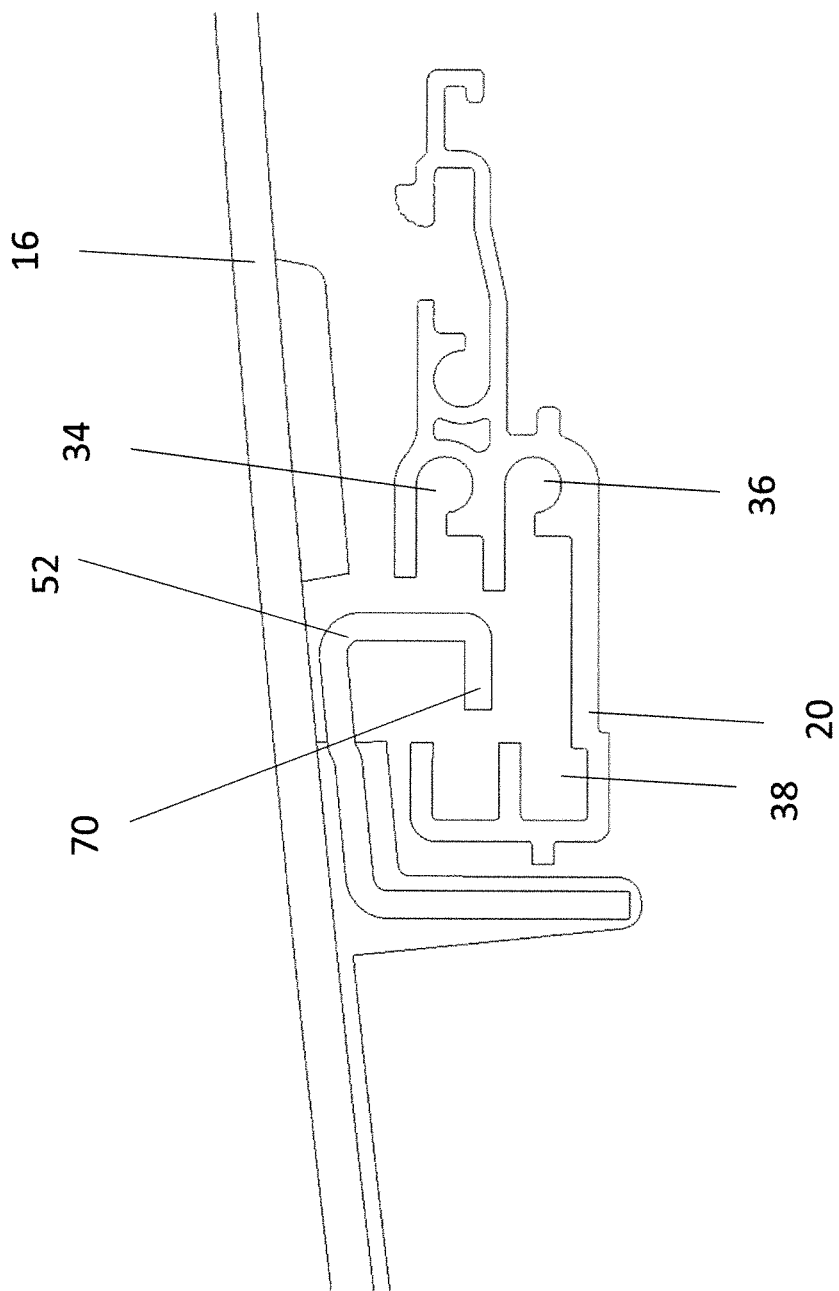
FIG. 13 is a section through a guide rail of the roof opening system.

Rear kinematic unit 24, which is illustrated in detail in FIGS. 11 and 12, comprises a drive slide 58, which is connected to second drive cable 30, which is guided in guide channel 36 of guide rail 20. A control rod 62 is hinged to second drive slide 58 via a hinge point 60, the end of control rod 62 facing away from drive slide 58 being hinged to a deploying lever 66 in a hinge point 64. A sliding element 68 is mounted on deploying lever 66 in a pivoting manner, the pivot axis of sliding element 68 coinciding with the pivot axis of hinge point 64. Sliding element 68 is guided in a sliding manner on a guide track 70, which is formed on cover support 52, which is disposed on the underside of cover element 16.

In its end area facing away from hinge point 64, deploying lever 66 has a bearing journal 72, which is guided in a sliding manner in a guide track 74, which is formed on guide rail 20. Moreover, a control journal 76 is disposed on deploying lever 66 in an area spaced apart from bearing journal 72, control journal 76 interacting with a slotted piece 78, which is also formed on guide rail 20 and has a curved shape with an upper exit opening 80. In its end area facing away from hinge point 64, deploying lever 66 has a holding journal 82, which interacts with a support track 84 when deploying lever 66 is in the deployed state, support track 84 being formed on guide rail 20 and being oriented essentially vertically.

Roof opening system 18 described above works in the manner described below.

Figure 2:
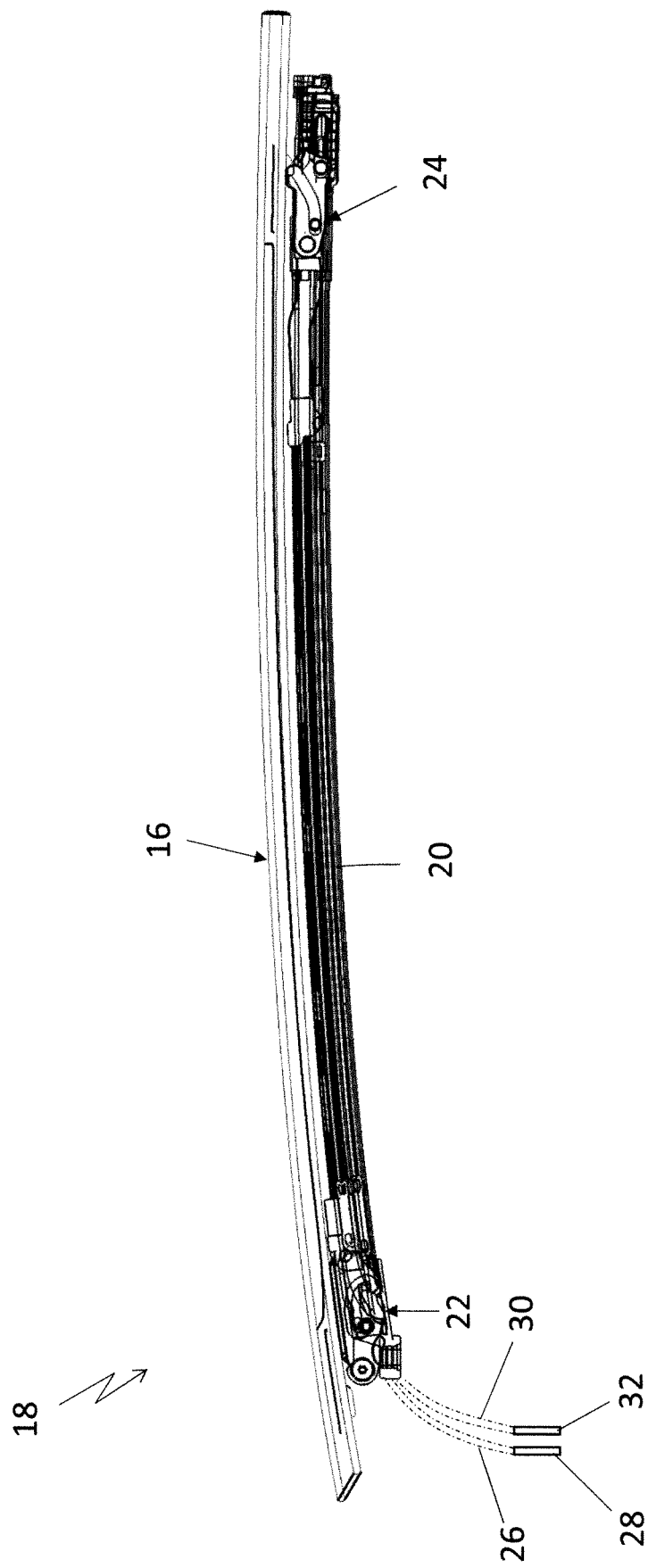
FIG. 2 is a schematic side view of a roof opening system of the vehicle roof of FIG. 1 with a cover element in a closed position.
Figure 3:
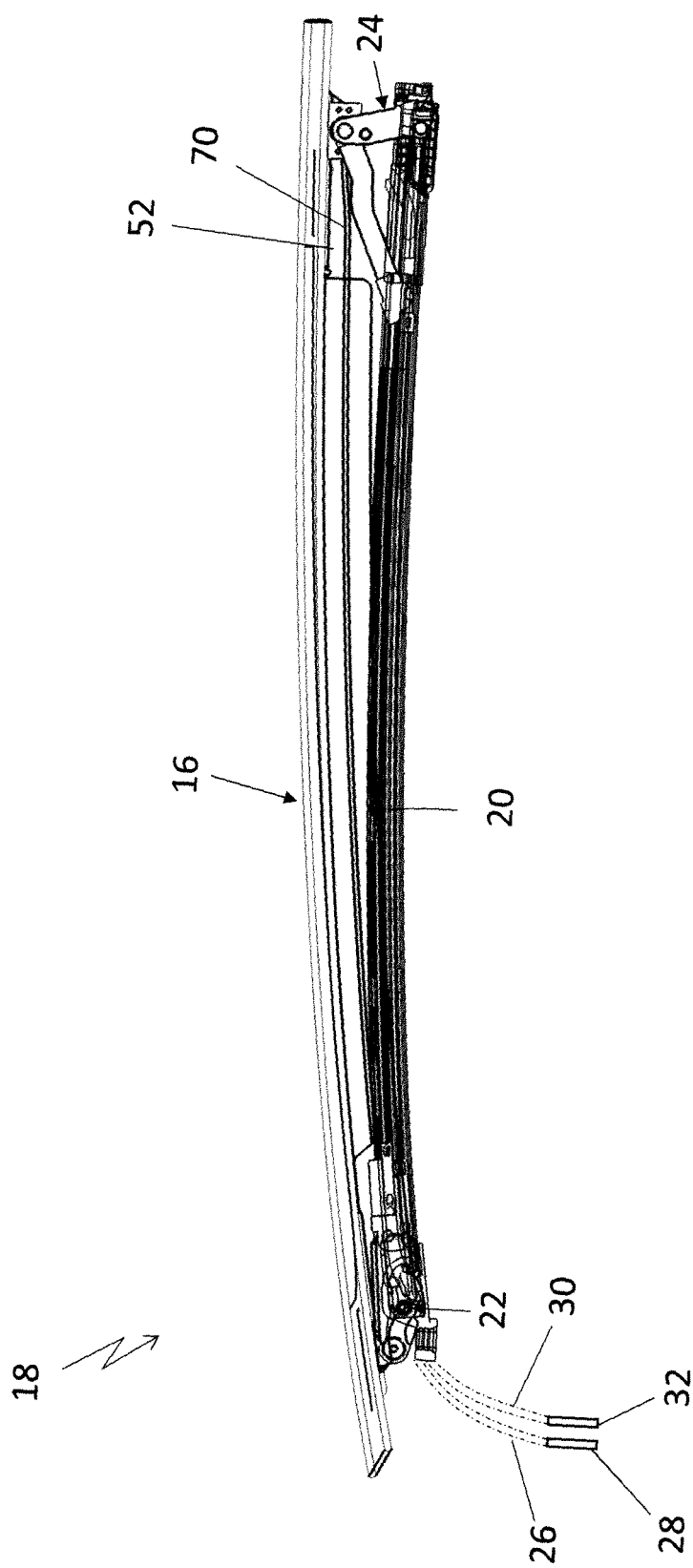
FIG. 3 is a view of the roof opening system corresponding to FIG. 2, but with the cover element in a ventilation position.
Figure 4:
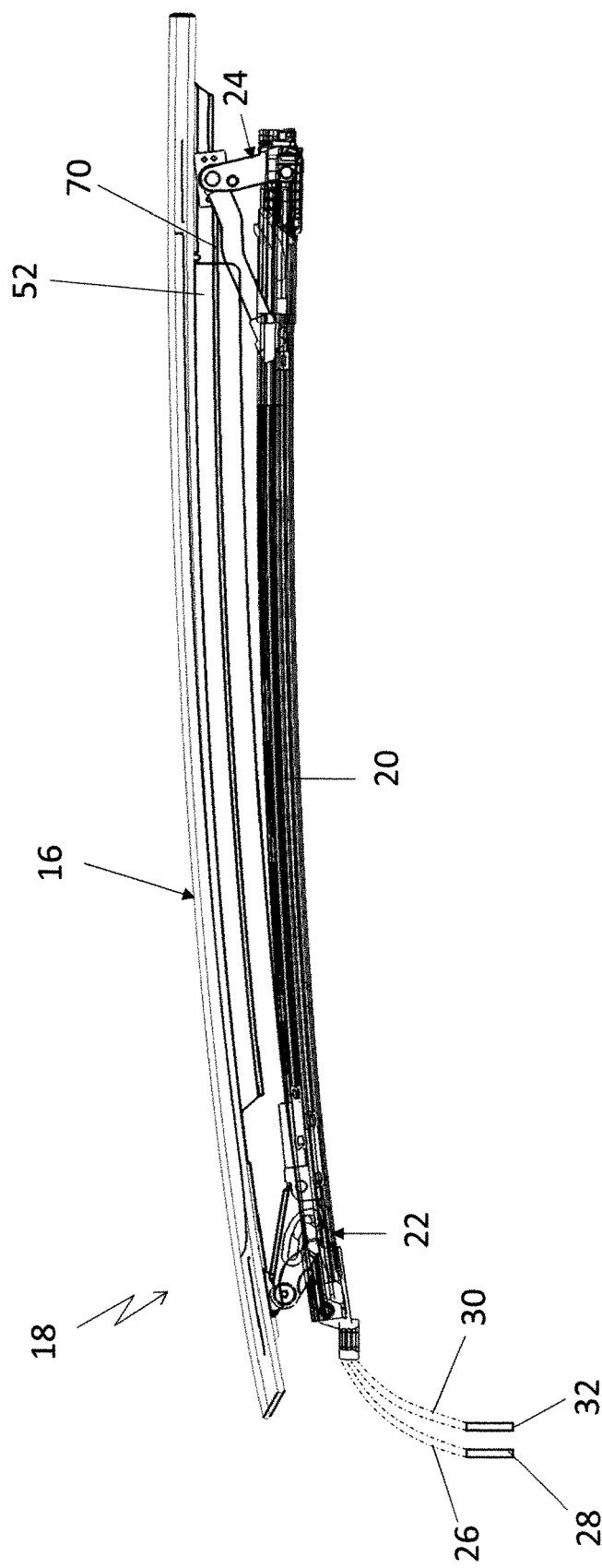
FIG. 4 is another view of the roof opening system corresponding to FIG. 2, but with the cover element moved slightly rearward.
Figure 5:
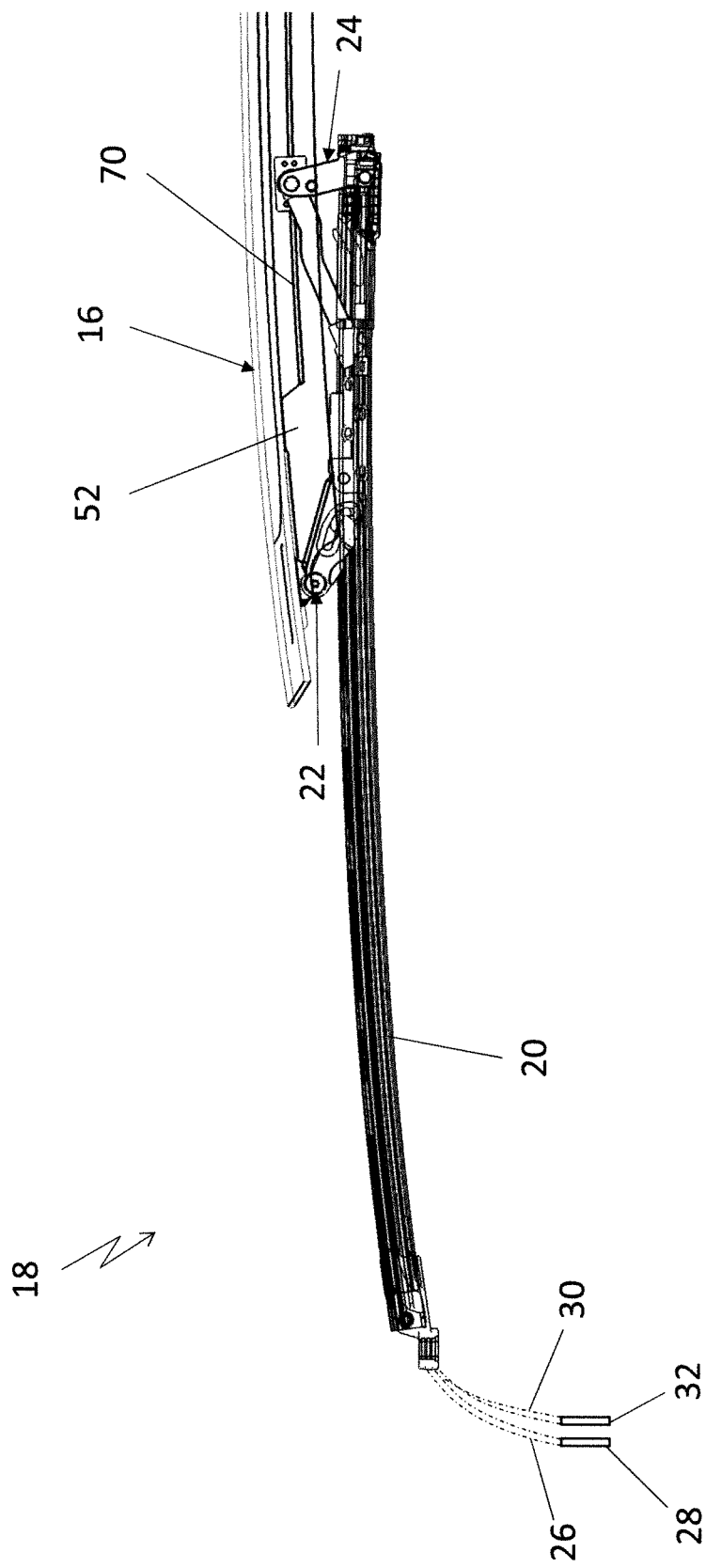
FIG. 5 is another view of the roof opening system corresponding to FIG. 2, but with the cover element in an open position.
Figure 6:
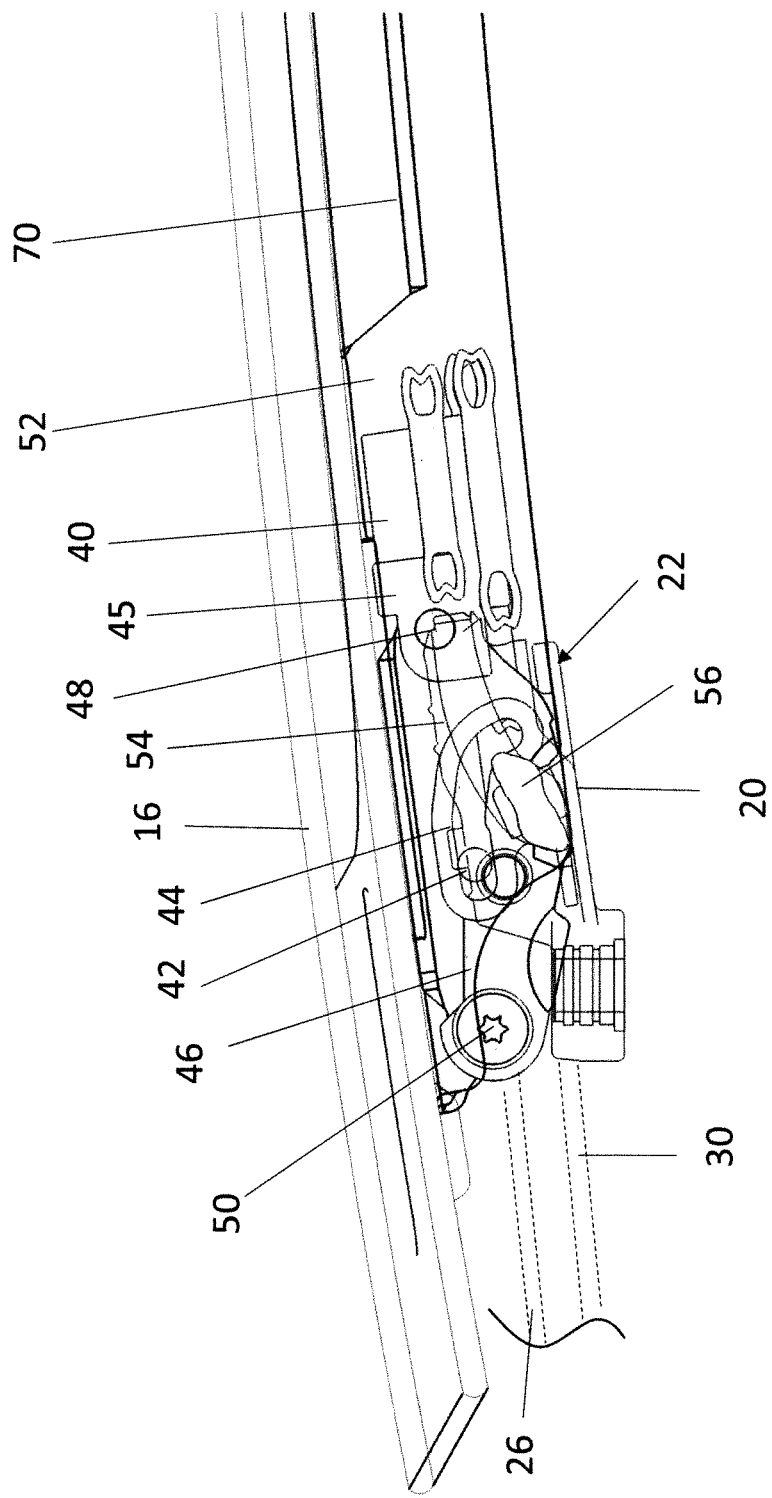
FIG. 6 is an enlarged view of a front kinematic unit of the roof opening system for the closed position of the cover element.
Figure 7:
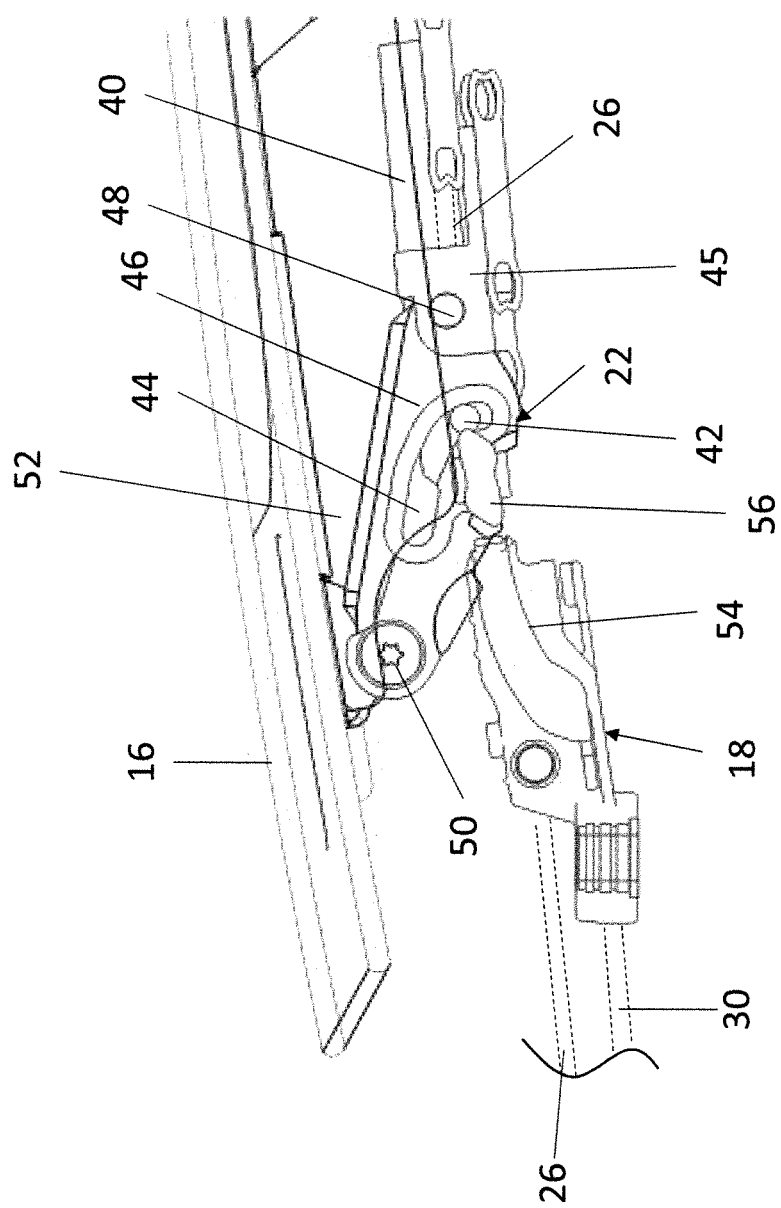
FIG. 7 is a view of the front kinematic unit corresponding to FIG. 6, but with the cover element in the raised state.
Figure 8:
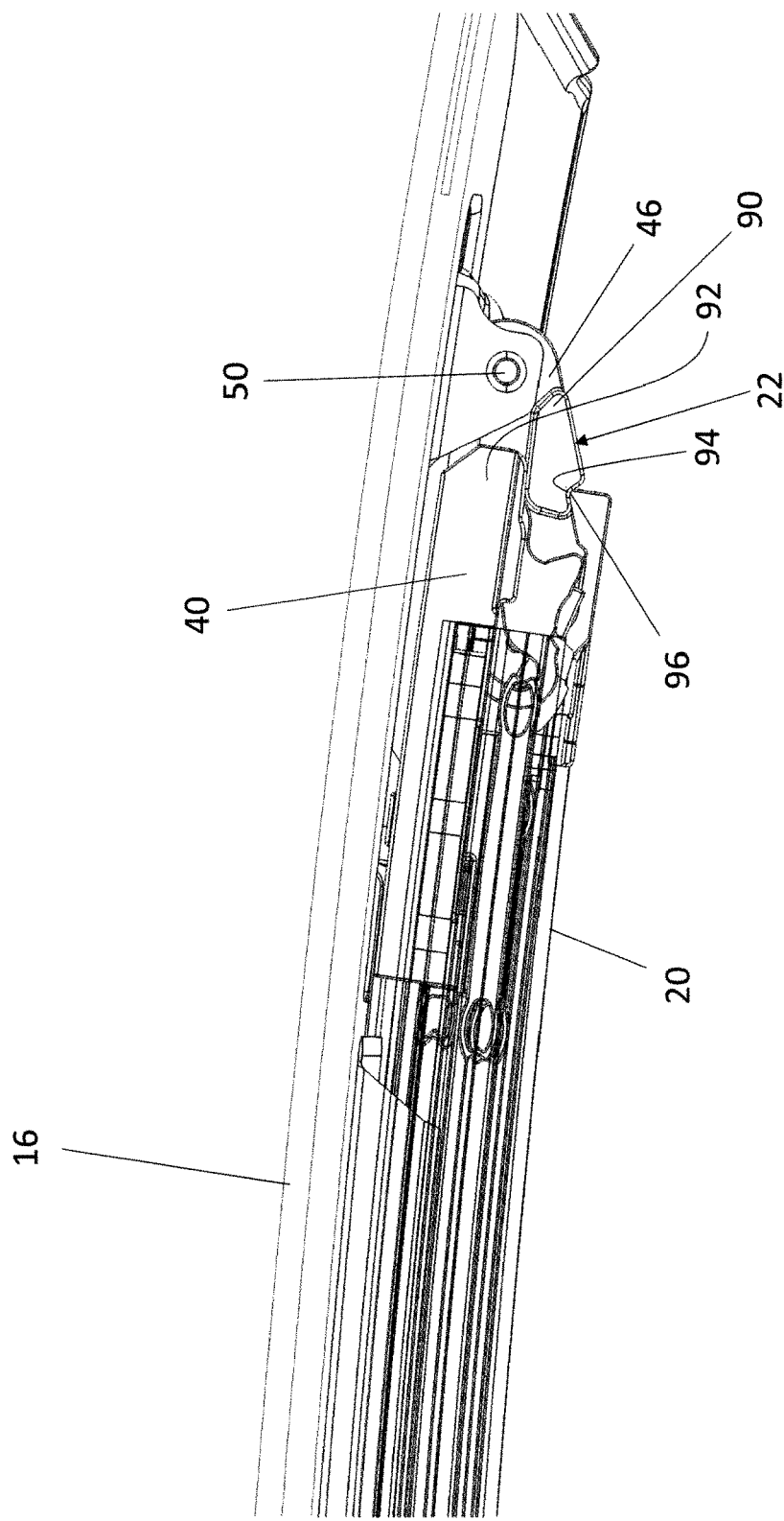
FIG. 8 is an interior view of the front kinematic unit of the roof opening system for the closed position of the cover element.
Figure 9:
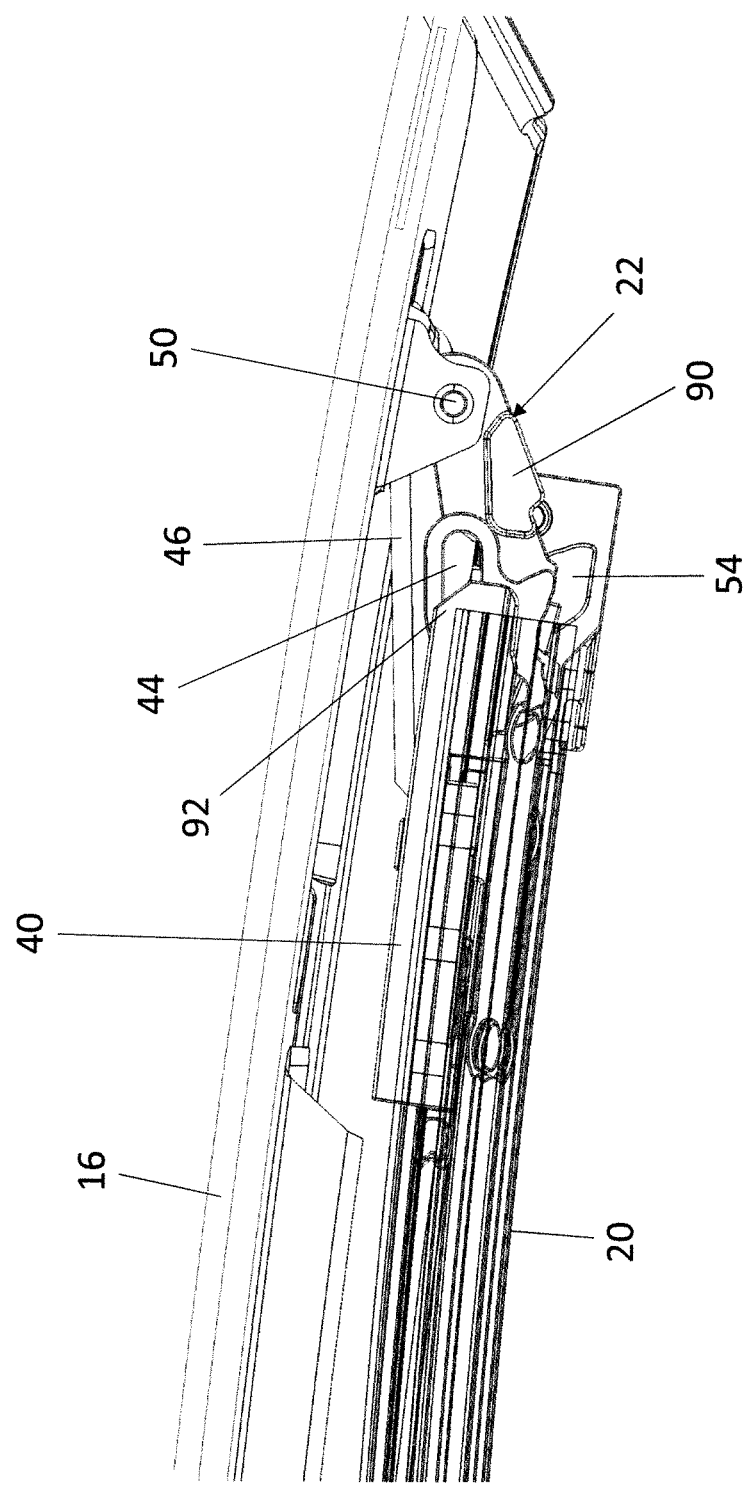
FIG. 9 is a view of the front kinematic unit corresponding to FIG. 8, but for an intermediate position of the cover element during the process of raising its front edge.
Figure 10:
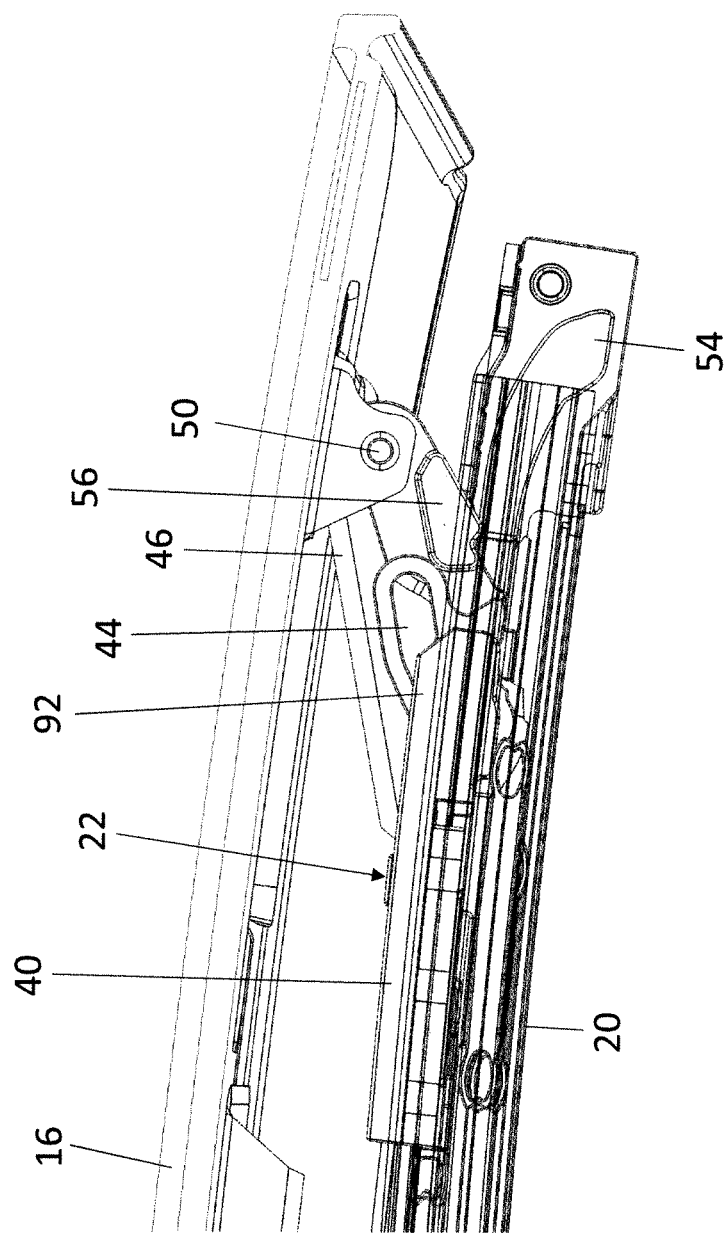
FIG. 10 is another view of the front kinematic unit corresponding to FIG. 8, but with the cover element in the raised state.

To move cover element 16 from the closed position, which is illustrated in FIG. 2, into the open position, which is illustrated in FIG. 5, first, both drive motors 28 and 32 are actuated, which causes drive slide 40 to be shifted relative to slide 45 by means of the first drive cable, as can be seen in FIGS. 6 to 12, with the result that securing protrusion 92 is pulled off of securing cam 90 of deploying lever 46 and the front edge of cover element 16 is slightly raised by the interaction of journal 42, which is formed on drive slide 40, with deploying slotted piece 44 of deploying lever 46 and by the interaction of guide journal 56 with slotted track 54. Since drive slide 40 is shifted rearward relative to deploying lever 46, securing protrusion 92 of drive slide 40 releases securing cam 90. Thus, deploying lever 46 can be moved from its lowered position, which is associated with the closed position of cover element 16, into its raised position, in which cover element 16 can be moved in the longitudinal vehicle direction. At the same time, deploying lever 66 is shifted rearward by means of second drive cable 30 via control rod 62, as a result of which control journal 76, which is guided in slotted piece 78, causes deploying lever 66 to deploy. Moreover, a torque acting in the deploying direction is introduced into deploying lever 66 via control rod 62. When bearing journal 72 strikes the rear end face of guide track 74, holding journal 82 of deploying lever 66 engages support track 84 of guide rail 20. Thus, deploying lever 66 is secured in the longitudinal direction of guide rail 20. Drive slide 58 is shifted until deploying lever 66 has reached its deployed position, which is illustrated in FIG. 9. At this point, control journal 76 has left slotted piece 78. Now, second drive motor 32 can be stopped. By continued operation of first drive motor 28, drive slide 40 is moved further rearward via first drive cable 26. Journal 42, which is formed on drive slide 40 and disposed in deploying slotted piece 44, thus pulls cover element 16 further rearward, the raised position of deploying lever 46 being secured by guide journal 56, which is disposed in a guide channel of guide rail 20. When moving cover element 16 back, guide track 70 of cover support 52 is guided on sliding element 68 of rear second kinematic unit 24, causing cover element 16 to be moved over fixed roof portion 14.

Cover element 16 is moved from its open position into its closed position vice-versa. At the end of the closing process, drive slide 40 is shifted relative to slide 45 of first kinematic unit 22, to which deploying lever 46 is hinged. The interaction of journal 42, which is formed on drive slide 40, with deploying slotted piece 44 and the interaction of guide journal 56 with slotted track 54 moves deploying lever 46 from its raised position into the lowered position. Subsequently, further shifting of drive slide 40 relative to slide 45 and deploying lever 46 moves securing protrusion 92 over securing cam 90, whereby deploying lever 46 is securely held in its lowered position. Drive slide 40 thus forms a securing slide for deploying lever 46 and cover element 16.

The invention claimed is:

1. A vehicle roof having a roof opening system comprising:
   a cover element which is displaceable between a closed position, in which a roof opening is closed, and an open position, in which the roof opening is open;
   displacement kinematics for displacing the cover element on either side of a vertical longitudinal center roof plane, each displacement kinematics comprising a guide rail, a first kinematic unit guided in the guide rail, and a second kinematic unit guided in the guide rail; and
   a set of drive cables for the two kinematic units, the first kinematic unit comprising a first deploying lever which is adjustable between a raised position and a lowered position, and the second kinematic unit comprising a second deploying lever,
   wherein the first kinematic unit comprises a securing slide which is guided in the guide rail and secures the first deploying lever in its lowered position,
   wherein the securing slide has a securing protrusion at the front, the securing protrusion interacting with a mating securing element to secure the first deploying lever in its lowered position, the mating securing element being disposed on the first deploying lever or on a component fixed to the cover element, and
   wherein the mating securing element has a groove on its underside, the groove engaging a stop element when the cover element is in the closed position, the stop element being disposed on the guide rail and holding the cover element in position in the longitudinal roof direction.

2. The vehicle roof according to claim 1, wherein the securing slide is a drive slide of the first kinematic unit, the drive slide actuating the first deploying lever.

3. The vehicle roof according to claim 1, wherein the mating securing element is a securing cam or journal which is disposed on the deploying lever and which extends perpendicular to the guide rail.

4. The vehicle roof according to claim 1, wherein the set of drive cables comprises a first drive cable, which is driven by a first drive motor and drives the first kinematic unit, and a second drive cable, which is driven by a second drive motor and drives the second kinematic unit.

5. The vehicle roof according to claim 1, wherein a sliding element is disposed on the second deploying lever, a guide track of a cover support of the cover element being guided on the sliding element when the cover element is being displaced.

* * * * *